United States Patent [19]

Craig et al.

[11] 3,899,369

[45] Aug. 15, 1975

[54] PROCESS FOR THE PRODUCTION OF MAGNETIC MATERIALS HAVING SELECTIVE COERCIVITY BY USING SELECTED D.C. MAGNETIC FIELDS

[75] Inventors: David R. Craig, Denver; George M. Lederle, Boulder; Franklin T. Plante, Longmont, all of Colo.

[73] Assignee: International Business Machines Corporation, Armonk, N.Y.

[22] Filed: Mar. 11, 1974

[21] Appl. No.: 449,862

[52] U.S. Cl................. 148/108; 75/.5 AA; 148/105; 148/31.55

[51] Int. Cl.[2].. C21D 1/04; C22B 23/04; H01F 1/02

[58] Field of Search................. 148/105, 108, 31.55; 75/.5 AA, 170

[56] References Cited

UNITED STATES PATENTS

| | | | |
|---|---|---|---|
| 2,884,319 | 4/1959 | Fabian et al. | 75/.5 AA |
| 3,494,760 | 2/1970 | Ginder | 75/.5 AA |
| 3,567,525 | 3/1971 | Graham et al. | 148/105 |
| 3,607,218 | 9/1971 | Akashi et al. | 75/.5 AA |
| 3,661,556 | 5/1972 | Jolley et al. | 75/.5 AA |
| 3,669,643 | 6/1972 | Bagley et al. | 148/105 |
| 3,684,484 | 8/1972 | Marchese et al. | 75/.5 AA |
| 3,726,664 | 4/1973 | Parker et al. | 75/.5 AA |
| 3,756,866 | 9/1973 | Parker et al. | 148/105 |

OTHER PUBLICATIONS

Tsu et al.; *Regulating Coercivity in Magnetic Thin Films*, in *IBM Tech. Discl. Bul.*, 4(8) Jan. 1962, pp. 52–53.

*Primary Examiner*—Walter R. Satterfield
*Attorney, Agent, or Firm*—Donald W. Margolis

[57] ABSTRACT

It has been found that magnetic particles which exhibit a figure of merit designated "$W/H_c$" of 1.2 or less, consistently offer the most desirable magnetic recording characteristics for high density magnetic recording media.

It has been found that production of cobalt-phosphorus particles by chemical reduction in a D.C. magnetic field of about 1000 gauss consistently produces magnetic particles having a $W/H_c$ of 1.2 or less, and selected coercivities of about 500 to 550 oersteds and about 850 to 950 oersteds when other bath and process parameters are controlled as taught herein.

3 Claims, No Drawings

PROCESS FOR THE PRODUCTION OF MAGNETIC MATERIALS HAVING SELECTIVE COERCIVITY BY USING SELECTED D.C. MAGNETIC FIELDS

CROSS REFERENCES TO RELATED APPLICATIONS

The following application is assigned to the assignee of the present invention: U.S. patent application Ser. No. 449,861, entitled "Process for the Production of Magnetic Materials", showing T. J. Beaulieu et al. as inventors, and filed simultaneously with this application.

BACKGROUND OF THE INVENTION

1. Field of the Invention

This invention relates to methods of making metallic magnetic cobalt-phosphorus alloy particles with selective coercivity by chemical reduction under the influence of a D.C. magnetic field, and to the use of such particles in magnetic recording media and magnetic recording systems.

2. Description of the Prior Art

The production of cobalt-phosphorus particles by chemical reduction, the control of coercivity of cobalt-phosphorus particles, and the use of a magnetic field during the production of magnetic particles and magnetic films are known in the prior art. However, the problem of defining a cobalt-phosphorus magnetic particle suitable for high density recording in terms of the figure of merit herein designated as "$W/H_c$", the importance and interpretation of $W/H_c$ and the effect of a specific type (D.C.) and magnitude (about 1000 gauss), of magnetic field on the $W/H_c$ of cobalt-phosphorus particles during their production have not previously been appreciated. The combination of this technique with bath and process parameters to also control coercivity has not been previously known. For example, prior art teachings of the use of a magnetic field during the production of magnetic material have often indicated that the use of A.C. or D.C. magnetic field was interchangeable, have designated neither A.C. nor D.C., or have failed to designate the required magnitude of the field.

Some efforts to provide a superior high density magnetic recording media attempted to substitute metallic magnetic particles for magnetic iron oxide. It was assumed, quite reasonably, that metallic magnetic particles having magnetic and physical characteristics equal to or better than iron oxide would provide a particulate magnetic recording media superior to media based upon magnetic iron oxide. Despite the theoretical superiority of metallic magnetic particles, they did not normally provide a signal superior to the signal from comparable iron oxide media at the same volume or weight loadings as iron oxide particles. Additionally, heretofore particulate magnetic recording media utilizing metallic magnetic particles has exhibited disappointingly poor resolution, erasability and saturability. Finally, when metallic magnetic particles have been provided, they have not necessarily been in a desirable or useful range of coercivities.

We thus find, in the prior art, the anomalous disagreement between theory and practice, which has led away from the utilization of metallic magnetic particles in particulate media.

As was indicated above, many techniques of making metallic magnetic particles, including the preparation of cobalt-phosphorus particles by chemical reduction, are known in the art. Additionally, many prior art techniques for making magnetic particles have utilized some form of magnetic field during the actual preparation of the particles. However, heretofore, the prior art has not provided a suitable figure of merit for characterization of cobalt-phosphorus or other metallic magnetic particles for use in recording media and then utilized that figure of merit to recognize the improvements which could be obtained in metallic magnetic cobalt-phosphorus particles having selected coercivities produced by chemical reduction by the application of a D.C. magnetic field of the proper magnitude during particle preparation. Without the recognition of the problem, the preparation of metallic magnetic particles by chemical reduction would remain a matter of chance, subject to inexplicable and non-reproducible successes and failures.

SUMMARY OF THE INVENTION

It is an object of the present invention to provide metallic magnetic cobalt-phosphorus particles produced by chemical reduction having improved characteristics and controlled coercivities for use in magnetic recording media.

It is another object of the present invention to provide such metallic magnetic cobalt-phosphorus particles having a $W/H_c$, as defined herein, of 1.2 or less.

Other objects will appear hereinafter.

These and other objects are accomplished in accordance with the broad aspects of the present invention by preparing a bath including a soluble cobalt salt and then chemically reducing the cobalt cations to cobalt metal in a D.C. magnetic field of about 1000 gauss using hypophosphite anions as a reducing agent. In the practice of this invention, other bath parameters and additives are selected and controlled to control the coercivity of the particles. The reaction time during which the magnetic particles are produced is critical, and can be controlled, for example, by quenching the reaction after a given period of time with large volumes of water. The presence or absence of other constituents in the reaction mixture are also varied to control coercivity of the particles formed. $W/H_c$ and coercivity of the resulting cobalt-phosphorus particles is considered to be indicative of the success or failure of treatment.

As shown in copending U.S. patent application Ser. No. 449,861, $W/H_c$ of 1.2 characterizes relatively uniform magnetic particles which can be used to produce improved recording characteristics. Lower $W/H_c$ achieves an even better result. Small uniform cobalt-phosphorus alloy particles having improved recording characteristics in magnetic recording media and controlled coercivities are formed by these techniques.

In preferred embodiments, selected amounts of cobalt cations, hypophosphite anions, and other bath constituents and parameters have been determined and are utilized to achieve a desired coercivity range with a low $W/H_c$. Where the reactants are thus controlled, the reaction can be utilized to produce metallic magnetic particles having both selected reproducible coercivity characteristics and a low $W/H_c$. For example, in some forms of magnetic media, coercivity on the order of about 500 oersteds is desirable for use with digital recording systems which are currently available on the market. However, it is anticipated that metallic magnetic particles having coercivities on the order of about 900 oersteds will be desirable for systems having higher recording densities, and such particles can also be produced.

The foregoing and other objects, features and advantages of this invention will be apparent from the following more particular description of preferred embodiments of the invention.

THEORY

The definition of $W/H_c$, and the theory upon which the use of $W/H_c$ as a figure of merit is based, is set forth in the above-referred-to copending U.S. patent application Ser. No. 449,861.

DESCRIPTION OF THE PREFERRED EMBODIMENTS

The powder samples prepared in accordance with the present invention are measured, for example with a vibrating sample magnetometer, VSM, to determine their minor and major loop characteristics and other magnetic properties. When desired, determination of the chemical content of the alloy particles is obtained by wet chemical analysis. Particle sizes and shapes are determined from electron micrographs.

In the preparation of the improved cobalt-phosphorus particles of the present invention, the cobalt cations are provided by the use of any suitable soluble cobalt salt, such as cobalt chloride, cobalt sulfate, cobalt acetate, cobalt sulfamate and others. The hypophosphite anion is normally brought into solution in the form of an alkaline metal hypophosphite. In the preferred preparations of cobalt-phosphorus particles, complexing agents, such as citrates, are brought into solution in the form of the acid or as an alkaline metal salt in varying ion concentrations. Hydroxide ions are required in the solution to maintain a basic reaction system, with ammonium hydroxide preferred. Catalysts, such as finely divided palladium metal or soluble palladium salts, are commonly utilized as nucleating sites to initiate the reaction. The 0.1% palladium chloride-hydrochloric acid referred to in the following examples was formed using 1 gram of palladium chloride and 10 cubic centimeters of 37% hydrochloric acid in a solution having a total volume of 1 liter. When catalysts are utilized, small quantities of the catalytic material can be found in the precipitated particles along with the cobalt and phosphorus constituents.

The following examples are given merely to aid in the understanding of the invention, and variations may be made by one skilled in the art without departing from the spirit of the present invention.

EXAMPLE I

A cylindrical beaker containing an aqueous 3,520 milliliter solution including 140 grams cobalt sulfate ($CoSO_4.7H_2O$), 280 grams sodium citrate ($Na_3C_6H_5O_7.2H_2O$), and 160 grams sodium hypophosphite ($NaH_2PO_2.H_2O$) was prepared, placed in a solenoidal magnetic field of 1,000 ± 100 gauss intensity, and heated to boiling. The solution was subjected to mechanical stirring during its preparation and heating. To the hot solution was added 80 milliliters of 0.1% palladium chloride ($PdCl_2$)-hydrochloric acid (HCl) solution followed in about 10 seconds by 400 milliliters of 28% ammonium hydroxide ($NH_4OH$). Stirring was stopped and within several seconds a vigorous reaction occurred in which the reaction mixture darkened and gas evolved from the mixture. Finely divided dark gray particles were formed and precipitated within the beaker. After about 6 minutes, the reaction was quenched with about 4000 milliliters of cold water. The magnetic field of the solenoid was then turned off, the dark precipitate allowed to settle, and the reaction mixture decanted. The particles were then washed three times with water, three times with acetone, and dried as completely as possible under non-oxidizing conditions. The particle yield was 86%, based on the amount of available cobalt.

A portion of the resulting particles was dispersed in an organic binder, coated on a substrate, the substrate placed within a 1000 oersted orienting magnetic field of a solenoid, and the binder dried. The resulting film was then used for determination of the $W/H_c$ of the particles by the VSM. A series of minor hysteresis loops and the major hysteresis loop of the coating was determined. Other magnetic properties were determined by packing dry particles in a glass cylinder for measurement by the VSM. The particles were found to exhibit an average coercive force of 510 oersteds and a squareness ratio of 0.82. The Full Width at Half Maximum "W" was found to be 260 oersteds, and the $W/H_c$ 0.51. Electron micrographs of the powder indicate that it consisted of particles having an average length of about 0.3 micron, with a length to width ratio of about 3 to 1. Its chemical composition was about 92.2% cobalt, 2.4% phosphorus, 0.6% palladium, with the balance believed to be oxygen, the oxygen being present mainly at the surface of the particles.

Using the technique of Example I, samples having intrinsic coercivities in the range of about 500 to about 550 oersteds and $W/H_c$'s of less than 1.2 can be consistently prepared. Materials in this coercivity range having good magnetic uniformity are formed into recording media which are easily written and read by contemporary recording equipment. However, such media produces 3 times the signal output of the best iron oxide media now available over a frequency range of 0 to 10,000 flux changes per inch.

Surprisingly, any significant variation from the procedure of Example I results in a substantial change in the intrinsic coercivity and $W/H_c$ of the cobalt-phosphorus produced.

EXAMPLE II

An aqueous 2100 milliliter solution containing 105 grams cobalt sulfate, 105 grams sodium citrate, and 600 grams sodium hypophosphite was prepared and heated to boiling within a solenoidal magnetic field of 1000 ± 100 gauss intensity while being vigorously stirred utilizing a mechanical mixer. To this hot solution was added 600 milliliters of a solution containing 3 grams sodium hypophosphite, 180 grams of Rohm % Haas Co. Acrysol A-5 aqueous polymer solution (25% A-5 polyacrylic acid by weight), and 30 milliliters of 0.1% palladium chloride-hydrochloric acid solution. This was then followed after about 10 seconds by the addition of 300 milliliters of 28% ammonium hydroxide aqueous solution. A vigorous reaction occurred and was allowed to proceed for about 8 minutes with continuous stirring, followed by quenching with an equal volume of cold water. The black precipitate formed by the reaction was then washed 3 times with water and 3 times with acetone, and dried under non-oxidizing conditions. The yield of the reaction was 50%, based on available cobalt.

As in Example I, portions of the sample were prepared and measured for their magnetic properties and $W/H_c$ with the VSM. The particles were found to exhibit an average intrinsic coercive force of 900 oersteds, a squareness ratio of 0.76, a FWHM of 250 oersteds, and an excellent low $W/H_c$ of 0.28.

Using the techniques of Example II, samples having intrinsic coercivities of about 850 oersteds to about 950 oersteds and $W/H_c$'s of less than about 0.35 can be consistently prepared. The procedure described in Example II must be strictly followed for $W/H_c$'s of less than 0.35 and high intrinsic coercivities of about 850 to about 950 oersteds to be realized. Coercivities in this range will be useful in future recording media when higher write currents are used to record even greater densities of information.

The magnetic field required for the practice of the present invention can be supplied in several ways. For example, a number of permanent magnets have been placed around a reaction vessel to provide a D.C. magnetic field of the required strength. However, the use of permanent magnets around a vessel of any substantial size can result in wide variations of magnetic field intensity within different areas of the vessel. A more practical means of supplying a magnetic field has proved to be the utilization of a solenoid completely surrounding the reaction vessel to generate a uniform magnetic field. The field within a vessel surrounded by a suitably prepared solenoid is relatively uniform to within about ± 10%. As used herein "solenoid" means a coil of electrically conductive material commonly in the form of a cylinder which, when carrying an electrical current, generates a magnetic field within the coil.

While the preferred D.C. magnetic field has been found to be about 1000 gauss, a range of fields between about 600 and about 1400 gauss has been found effective to provide particles with a $W/H_c$ of 1.2 or less and controlled coercivity.

It would appear likely that A.C. magnetic fields could be utilized to obtain the same results as the D.C. magnetic field taught by the present invention. This is not the case. Only D.C. magnetic fields have been found to produce $W/H_c$'s substantially below 1.2. Where A.C. magnetic fields or no magnetic field have been used, the $W/H_c$'s have been, typically, about 1.5 to about 4. Similarly, the combination of both A.C. and D.C. fields has been found to be unsuitable to produce magnetic cobalt-phosphorus particles having a $W/H_c$ of less than 1.2.

Uses for the materials produced in accordance with the teaching of this invention are well known. The low $W/H_c$ controlled coercivity cobalt-phosphorus alloy particles produced by the foregoing examples may be quickly and homogeneously dispersed with non-magnetic organic film-forming materials and their solvents to produce magnetic media. Typical, but not limiting, binders for preparing various recording media including ferromagnetic particles produced in accordance with this invention are phenoxies, epoxies, polyesters, cellulose esters and ethers, vinyl chloride, vinyl acetate, acrylate and styrene polymers and copolymers, polyurethanes, polyamides, aromatic polycarbonates, polyphenyl ethers and various mixtures thereof. A wide variety of solvents may be used for forming a dispersion of the ferromagnetic particles and binders. Organic solvents, such as ethyl, butyl, and amyl acetate, isopropyl alcohol, dioxane, acetone methyl ethyl ketone, methylisobutyl ketone, ethylene glycol monomethyl ether acetate, cyclonexanone, tetrahydrofuran and toluene are useful for this purpose.

The particle-binder dispersion may be applied to a suitable substrate by roller coating, gravure coating, knife coating, extrusion, or spraying of the mixture onto the backing, or by other known methods. The specific choice of non-magnetic substrate, binder, solvent, or method of application of the magnetic composition to the support will vary with the properties desired and the specific form of the magnetic recording medium being produced.

In preparing recording media, the treated magnetic particles of the present invention usually comprise about 40% to 90%, by weight, of the solids in the film layer applied to the substrate. The substrate is usually a flexible resin, such as polyester or cellulose acetate material; although other flexible materials as well as rigid base materials are more suitable for some uses.

While the invention has been particularly shown and described with reference to preferred embodiments thereof, it will be understood by those skilled in the art that various changes in form and details may be made therein without departing from the spirit and scope of the invention.

What is claimed is:

1. A method for preparing finely divided magnetic cobalt-phosphorus alloy particles having a $W/H_c$ less than about 1.2 and controlled coercivities in the range of about 500 to 550 oersteds and about 850 to 950 oersteds, said process comprising:

preparing a solution consisting essentially of 35 g/l cobalt sulfate, sodium hypophosphite in an amount selected from the group consisting of 40 g/l and 200 g/l, and sodium citrate in an amount selected from the group consisting of 70 g/l and 35 g/l;

stirring and heating said solution;

adding to said solution a hot solution of 5 g/l of sodium hypophosphite and 300 g/l of 25% by weight polyacrylic acid, said hot solution being added in an amount selected from the group consisting of 0 ml and 200 ml per liter of said cobalt sulfate solution;

adding to said solution 0.1% palladium chloride-hydrochloric acid solution in an amount selected from the group consisting of 20 ml and 10 ml per liter of said initial cobalt sulfate solution;

after about 10 seconds adding to said solution 28% ammonium hydroxide in an amount equal to 100 ml per liter of said original cobalt sulfate solution;

and then reacting said solution in the presence of a D.C. magnetic field of about 600 to 1400 gauss to form magnetic cobalt-phosphorus particles having coercivities in the range of about 500 to 550 oersteds and about 850 to 950 oersteds and a $W/H_c$ less than about 1.2.

2. The method of claim 1 wherein the particles produced have controlled coercivities in the range of about 500 to 550 oersteds, the sodium hypophosphite is 40 g/l, the sodium citrate is 70 g/l, the hot sodium hypophosphite-polyacrylic acid solution is 0 ml, the 0.1% palladium chloride-hydrochloric acid is 20 ml, the D.C. magnetic field present during the reaction is about 1000 gauss, and wherein the reaction is quenched after about 6 minutes.

3. The process of claim 1 wherein the particles produced have controlled coercivities in the range of about 850 to 950 oersteds, the sodium hypophosphite is 200 g/l, the sodium citrate is 35 g/l, the hot sodium hypophosphite-polyacrylic acid solution is 200 ml, the 0.1% palladium chloride-hydrochloric acid solution is 10 ml, and the D.C. magnetic field is about 1000 gauss, and wherein the reaction is quenched after about 8 minutes.

* * * * *

UNITED STATES PATENT AND TRADEMARK OFFICE

CERTIFICATE OF CORRECTION

PATENT NO. : 3,899,369

DATED : August 15, 1975

INVENTOR(S) : D. R. Craig, G. M. Lederle and F. T. Plante

It is certified that error appears in the above-identified patent and that said Letters Patent are hereby corrected as shown below:

Title page, line 2, "August 15, 1975" should be --August 12, 1975--.

Signed and Sealed this

Twenty-sixth Day of October 1976

[SEAL]

*Attest:*

RUTH C. MASON
*Attesting Officer*

C. MARSHALL DANN
*Commissioner of Patents and Trademarks*